United States Patent
Ishihata et al.

(10) Patent No.: US 9,400,052 B2
(45) Date of Patent: Jul. 26, 2016

(54) GASKET

(71) Applicants: Nippon Pillar Packing Co., Ltd., Osaka-shi (JP); Toyota Jidosha Kabushiki Kaisha, Toyota-shi (JP)

(72) Inventors: Takato Ishihata, Toyota (JP); Osamu Sawai, Toyota (JP); Hiroki Tanabe, Osaka (JP); Yuji Yanagitake, Osaka (JP); Yuta Sato, Osaka (JP)

(73) Assignees: Nippon Pillar Packing Co., Ltd., Osaka-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/808,495

(22) Filed: Jul. 24, 2015

(65) Prior Publication Data

US 2016/0025223 A1    Jan. 28, 2016

(30) Foreign Application Priority Data

Jul. 25, 2014    (JP) .................................. 2014-151749

(51) Int. Cl.
*F16J 15/32*    (2016.01)
*F16J 15/06*    (2006.01)
(Continued)

(52) U.S. Cl.
CPC .............. *F16J 15/062* (2013.01); *F01N 13/08* (2013.01); *F01N 13/1805* (2013.01); *F01N 13/1844* (2013.01); *F16J 15/102* (2013.01);
(Continued)

(58) Field of Classification Search
CPC ........... F16J 15/02; F16J 15/022; F16J 15/06; F16J 15/061; F16J 15/062; F16L 23/04; F16L 23/16; F16L 23/162; F16L 23/18; F16L 23/22; F16L 27/04; F16L 27/053
See application file for complete search history.

(56) References Cited

U.S. PATENT DOCUMENTS 5,683,119 A * 11/1997 Emmons .............. F01N 13/1811
285/146.3

FOREIGN PATENT DOCUMENTS

| DE | 25 18 898 A1 | 11/1976 |
| JP | 7-113469 | 5/1995 |
| JP | 2004-76692 | 3/2004 |

OTHER PUBLICATIONS

Extended European Search Report issued Nov. 25, 2015 in Patent Application No. 15178201.8.

*Primary Examiner* — Gilbert Lee
(74) *Attorney, Agent, or Firm* — Oblon, McClelland, Maier & Neustadt, L.L.P.

(57) ABSTRACT

A gasket in which a high sealing property can be certainly ensured is provided. A gasket 1 is to be interposed between a first flange 21 of a first exhaust pipe 11 and a second flange 22 of a second exhaust pipe 12 in a state where the gasket is fitted onto an end portion of the first exhaust pipe, in order to seal a gap between end portions of the first and second exhaust pipes 11, 12. The gasket 1 includes a first sealing portion 51 and a second sealing portion 52. The first sealing portion has a first butting surface 51*a* having a tapered shape corresponding to a tapered shape of a first tapered inner circumferential surface 27*a* of the first flange, and a first projecting portion 51*b*. The first sealing portion is formed in a radially outer side of the gasket. The second sealing portion has a second butting surface 52*a* having a tapered shape corresponding to a tapered shape of a second tapered inner circumferential surface of the second flange, and a second projecting portion 52*b*. The second sealing portion is formed in a radially outer side of the gasket.

4 Claims, 7 Drawing Sheets

(51) Int. Cl.
  *F01N 13/08* (2010.01)
  *F01N 13/18* (2010.01)
  *F16J 15/10* (2006.01)
  *F16J 15/12* (2006.01)
  *F16L 23/16* (2006.01)
  *F16L 23/18* (2006.01)
  *F16L 23/22* (2006.01)
  *F16L 25/12* (2006.01)

(52) U.S. Cl.
  CPC ............ *F16J 15/121* (2013.01); *F16L 23/162* (2013.01); *F16L 23/18* (2013.01); *F16L 23/22* (2013.01); *F16L 25/12* (2013.01)

GASKET

TECHNICAL FIELD

The present invention relates to a gasket to be used in a joint for exhaust pipes of an automobile or the like.

BACKGROUND ART

In the field of automobiles or the like, for example, a seal member which is disclosed in Patent Literature 1 is known as a seal member (gasket) that is to be interposed between an upstream exhaust pipe and a downstream exhaust pipe. The seal member is interposed between a first flange of the upstream exhaust pipe and a second flange of the downstream exhaust pipe in order to seal the gap between end portions of the upstream and downstream exhaust pipes.

The seal member is configured by using expanded graphite and a metal mesh, and includes a first sealing surface and a second sealing surface. The first sealing surface is configured as a convex spheroidal surface which is to butt slidably against a concave spheroidal sealing surface disposed on the first flange. The second sealing surface is configured as a convex spheroidal surface which is to butt slidably against a concave spheroidal sealing surface disposed on the second flange.

However, the gasket has the configuration where the first and second sealing surfaces having a convex spheroidal shape simply butt against the concave spheroidal sealing surfaces of the corresponding flanges, respectively, and therefore cannot ensure a high sealing property between the first and second flanges. Namely, there is room for improvement in the sealing property of a gasket.

PRIOR ART LITERATURE

Patent Literature

Patent Literature 1: Japanese Patent Application Laid-Open No. 2004-76692

SUMMARY OF THE INVENTION

Problems To Be Solved By The Invention

The invention has been conducted in view of the above-discussed circumstances. It is an object of the invention to provide a gasket in which a high sealing property can be certainly ensured.

Means For Solving The Problems

A first mode of the invention provides a gasket which is annular, which is to be interposed between a first flange of a first exhaust pipe and a second flange of a second exhaust pipe in a state where the gasket is fitted onto an end portion of the first exhaust pipe, in order to seal a gap between an end portion of the first exhaust pipe and an end portion of the second exhaust pipe, the gasket being configured by using an expanded graphite tape and a metal mesh member, wherein the gasket includes: a first sealing portion having: a first butting surface having a tapered shape corresponding to a tapered shape of a first tapered inner circumferential surface of the first flange in which a diameter is gradually increased as proceeding toward the second flange; and a first projecting portion which is projectable toward the first tapered inner circumferential surface as compared with the first butting surface, the first sealing portion being formed in a radially outer side so as to allow the first butting surface and the first projecting portion to butt against the first tapered inner circumferential surface; and a second sealing portion having: a second butting surface having a tapered shape corresponding to a tapered shape of a second tapered inner circumferential surface of the second flange in which a diameter is gradually increased as proceeding toward the first flange; and a second projecting portion which is projectable toward the second tapered inner circumferential surface as compared with the second butting surface, the second sealing portion being formed in a radially outer side so as to allow the second butting surface and the second projecting portion to butt against the second tapered inner circumferential surface.

According to the configuration, when sealing is performed by using the gasket, the whole first sealing portion is pressed against the first tapered inner circumferential surface of the first flange which is opposed to the first sealing portion, to cause the first projecting portion to collapse, whereby the contact surface pressure between the first sealing portion and the first flange can be increased. In this case, the whole second sealing portion is pressed by the second tapered inner circumferential surface of the second flange which is opposed to the second sealing portion, to cause the second projecting portion to collapse, whereby the contact surface pressure between the second sealing portion and the second flange can be increased. Therefore, a high sealing property can be ensured between the first and second flanges.

According to a second mode of the invention, in the gasket of the first mode, the gasket further includes an outer circumferential portion which is formed between the first sealing portion and the second sealing portion with respect to an axial direction, and the first sealing portion and the second sealing portion are formed into a shape which is symmetrical across the outer circumferential portion.

According to the configuration, it is possible to enable the gasket which is interposed between the first and second flanges, to more certainly exert a high sealing property irrespective of the direction of the gasket. When the gasket is to be fitted onto the first exhaust pipe, moreover, it is not necessary to consider the direction of the gasket, and hence the workability can be improved.

According to a third mode of the invention, in the gasket of the first or second mode, the gasket further includes an exposed portion which is disposed in a radially inner side of the second sealing portion to be exposed to interiors of the first exhaust pipe and the second exhaust pipe, and metal wires of the metal mesh member are concentrically disposed in the exposed portion.

According to the configuration, when the first and second flanges are to be fastened to each other, excess deformation of the whole gasket caused by the exposed portion can be prevented from occurring. Therefore, the contact surface pressure of the second butting surface of the second sealing portion with respect to the tapered inner circumferential surface of the second flange can be maintained at a predetermined value, and reduction of the sealing property of the gasket can be suppressed.

Moreover, the metal wires of the metal mesh member can cause the expanded graphite portion of the expanded graphite tape to hardly contact with the exhaust gas flowing through the interiors (exhaust gas flow path) of the first and second exhaust pipes. Therefore, deterioration of the expanded graphite portion due to contact with the exhaust gas can be suppressed, and the durability of the gasket can be improved.

Effects of the Invention

According to the invention, it is possible to provide a gasket in which a high sealing property can be certainly ensured.

DESCRIPTION OF PREFERRED EMBODIMENTS

Preferred embodiments of the invention will be described with reference to the drawings.

Figure 1:
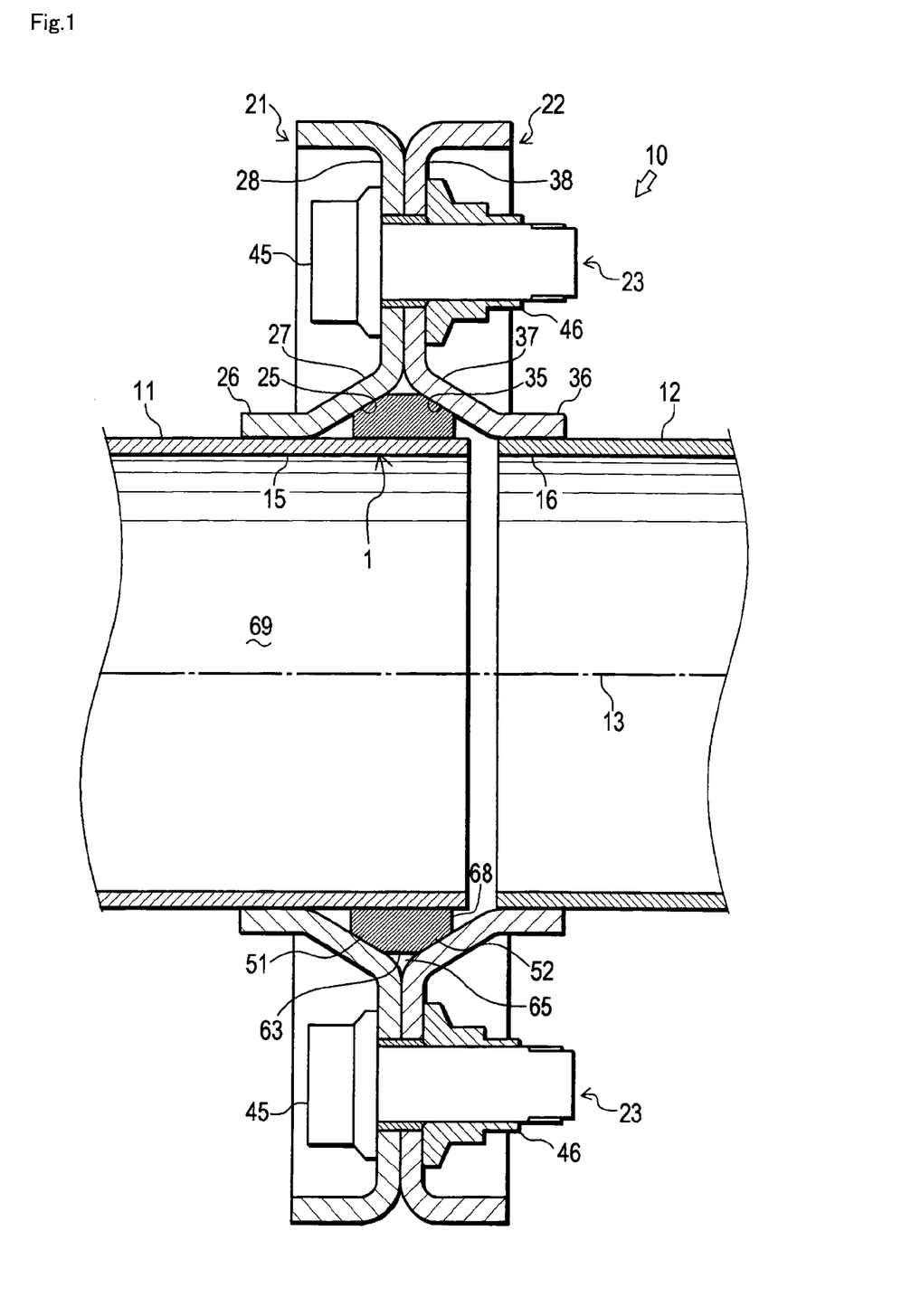
FIG. 1 is a sectional view of a joint in which a gasket of an embodiment of the invention is used.

FIG. 1 is a sectional view of a joint 10 in which a gasket 1 of an embodiment of the invention is used. In the following description, a case where the gasket 1 is applied to the joint 10 as shown in FIG. 1 will be exemplarily described.

As shown in FIG. 1, the gasket 1 is used in the joint 10 for an exhaust pipe of an automobile or the like. The exhaust pipe has a first exhaust pipe 11 which is connected to an engine of the automobile or the like, and which is on the upstream side, and a second exhaust pipe 12 which is located downstream from the first exhaust pipe 11 in the flow direction of the exhaust gas. Each of the first exhaust pipe 11 and the second exhaust pipe 12 is configured by a cylindrical steel pipe. The exhaust pipes are coupled to each other through the joint 10 so as to have the same axis 13.

The joint 10 is used for connecting the exhaust gas flow direction downstream end portion (tip end portion) 15 of the first exhaust pipe 11 with the exhaust gas flow direction upstream end portion (basal end portion) 16 of the second exhaust pipe 12 which is opposed thereto via a predetermined gap, and disposed between the end portions 15, 16. In the embodiment, the joint 10 includes a first flange 21, a second flange 22, the gasket 1, and a press contacting mechanism 23.

The first flange 21 is disposed on the outer circumference of the tip end portion 15 of the first exhaust pipe 11. The first flange 21 is formed by a sheet metal member, and has a first flange surface 25. The first flange 21 is disposed so as to be projected from the outer circumferential surface of the tip end portion 15 of the first exhaust pipe 11 toward the radially outer side in a state where the first flange surface 25 is directed to the downstream side in the flow direction of the exhaust gas.

Specifically, the first flange 21 has a first cylindrical portion 26, a first tapered portion 27, and a first flange portion 28. The first cylindrical portion 26 is fitted onto the tip end portion 15 of the first exhaust pipe 11, and fixed thereto by welding or the like. The first tapered portion 27 is extended from the first cylindrical portion 26 toward the radially outer side. The first flange portion 28 is extended from the first tapered portion 27 toward the radially outer side.

In the first flange 21, the first tapered portion 27 is formed into a tapered shape in which the diameter is gradually increased as proceeding from the first cylindrical portion 26 toward the exhaust gas flow direction downstream side (side of the second flange 22). The first tapered portion 27 has a first tapered inner circumferential surface 27a which constitutes a part of the first flange surface 25, on the radially inner side (see FIG. 6), and is formed so that the first tapered inner circumferential surface 27a can be in contact with a part (first sealing portion 51 which will be described later) of the gasket 1.

The second flange 22 is disposed on the outer circumference of the basal end portion 16 of the second exhaust pipe 12. The second flange 22 is formed by a sheet metal member, and has a second flange surface 35. The second flange 22 is disposed so as to be projected from the outer circumferential surface of the basal end portion 16 of the second exhaust pipe 12 toward the radially outer side in a state where the second flange surface 35 is directed to the upstream side in the flow direction of the exhaust gas in order to cause the second flange surface 35 to be opposed to the first flange surface 25 of the first flange 21.

Specifically, the second flange 22 has a second cylindrical portion 36, a second tapered portion 37, and a second flange portion 38. The second cylindrical portion 36 is fitted onto the basal end portion 16 of the second exhaust pipe 12, and fixed thereto by welding or the like. The second tapered portion 37 is extended from the second cylindrical portion 36 toward the radially outer side. The second flange portion 38 is extended from the second tapered portion 37 toward the radially outer side.

In the second flange 22, the second tapered portion 37 is disposed upstream (on the side of the first flange 21) in the exhaust gas flow direction from the basal end portion 16 of the second exhaust pipe 12, and formed into a tapered shape in which the diameter is gradually increased as proceeding from the second cylindrical portion 36 toward the exhaust gas flow direction upstream side. The second tapered portion 37 has a second tapered inner circumferential surface 37a which constitutes a part of the second flange surface 35, on the radially inner side (see FIG. 7), and is formed so that the second tapered inner circumferential surface 37a can be in contact with a part (second sealing portion 52 which will be described later) of the gasket 1.

The gasket 1 is an annular member, and, in order to seal the gap between the tip end portion 15 of the first exhaust pipe 11 and the basal end portion 16 of the second exhaust pipe 12, interposed between the first and second flanges 21, 22 of the first and second exhaust pipes 11, 22 which are opposed to each other, in a state where the gasket is fitted onto the first exhaust pipe 11. In the embodiment, the gasket 1 has a circular annular shape, and is closely fitted onto a portion of the first exhaust pipe 11 which is downstream from the first flange 21 in the flow direction of the exhaust gas, so as to have the same axis 13.

The press contacting mechanism 23 is configured so that the first flange 21 and the second flange 22 can be fasteningly connected to each other, thereby making the radially outer portions of the flanges 21, 22 to close to each other in the state where the gasket 1 is interposed between the flanges 21, 22. In the embodiment, the press contacting mechanism 23 has bolts 45 and nuts 46, and is configured so as to enable the radially outer portion of the first flange 21 to press contact with that of the second flange 22, thereby preventing the gasket 1 from being exposed to the outside of the joint 10.

Figure 2:
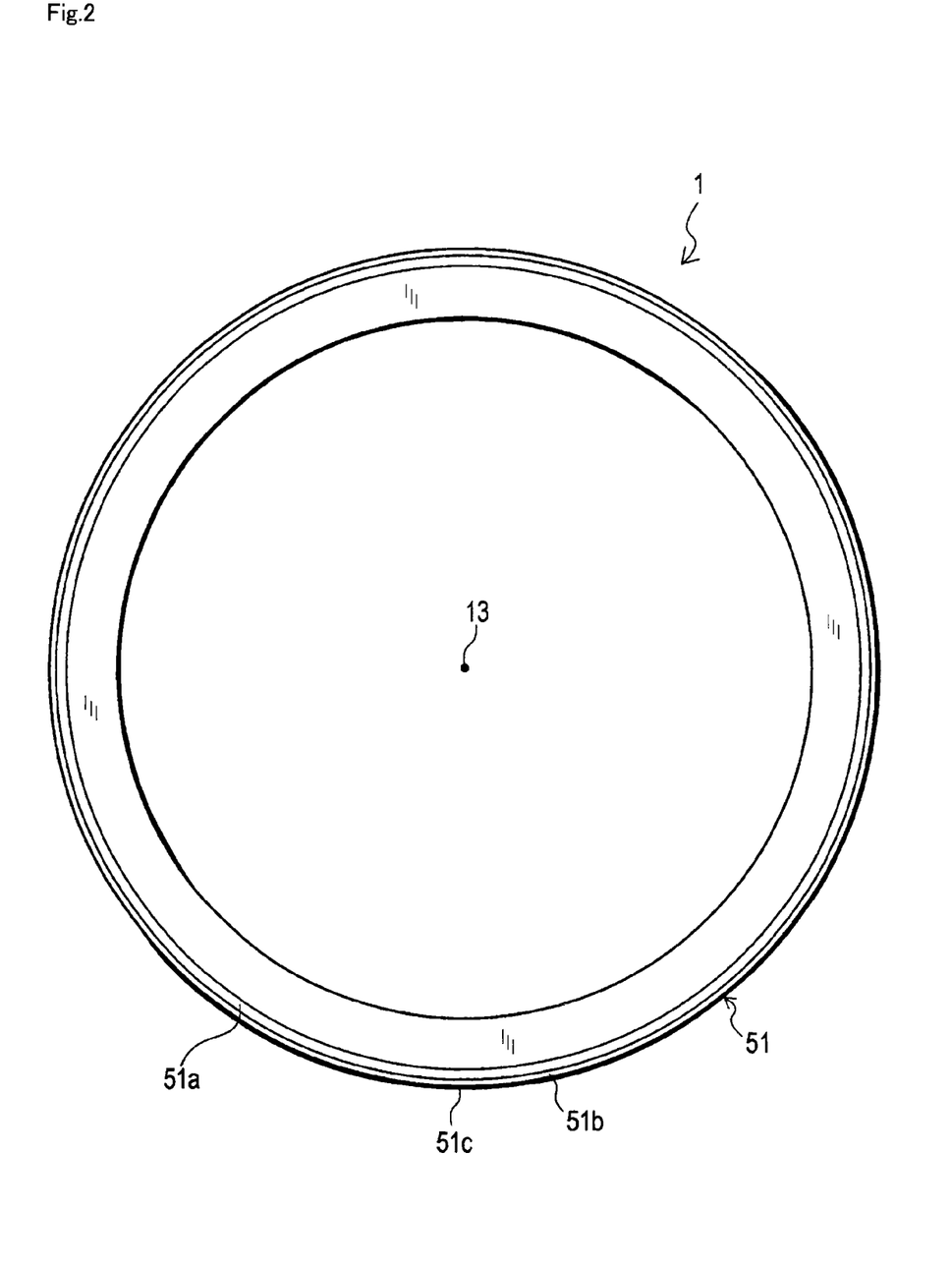
FIG. 2 is a front view of the gasket of FIG. 1.
Figure 3:
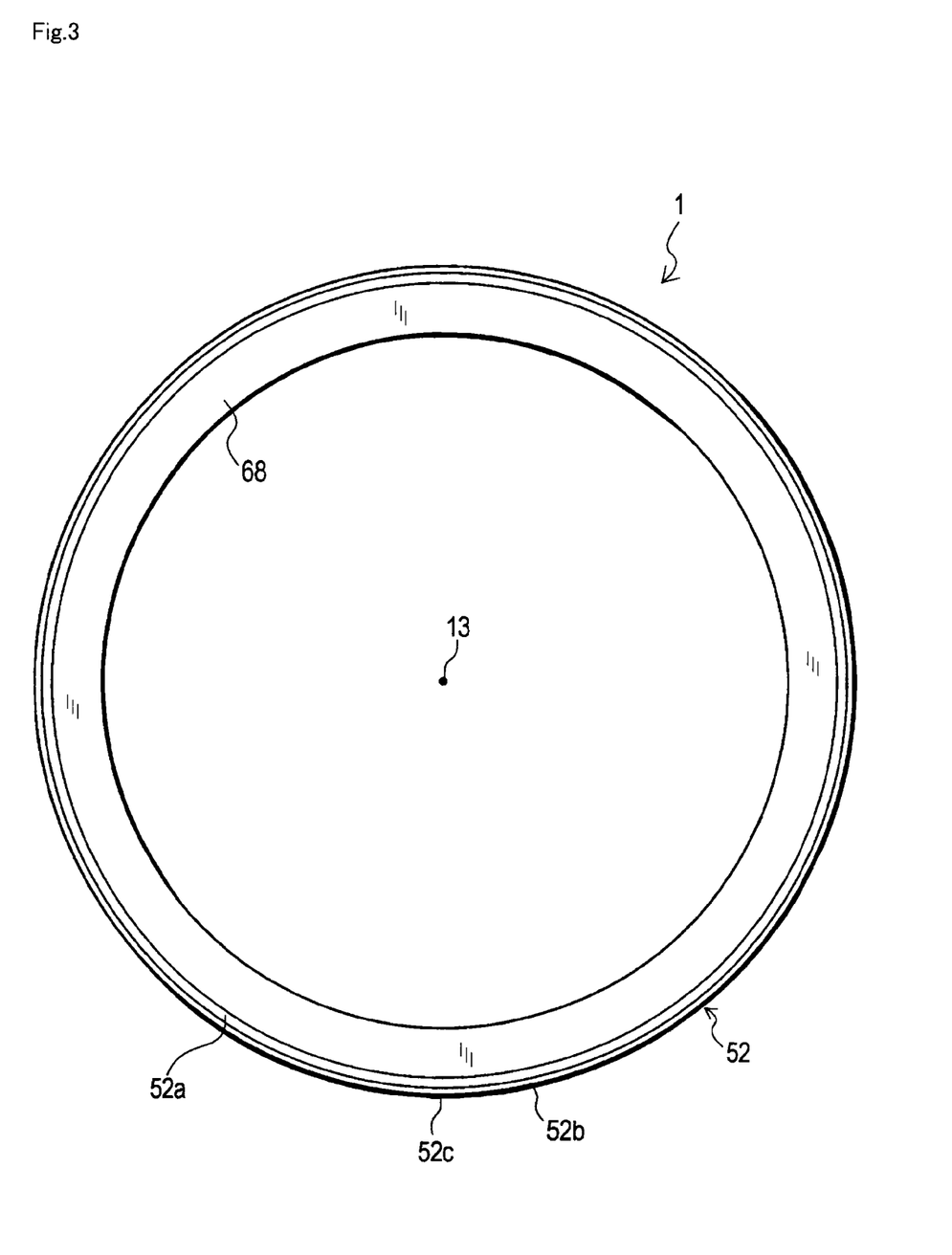
FIG. 3 is a back view of the gasket of FIG. 1.
Figure 4:
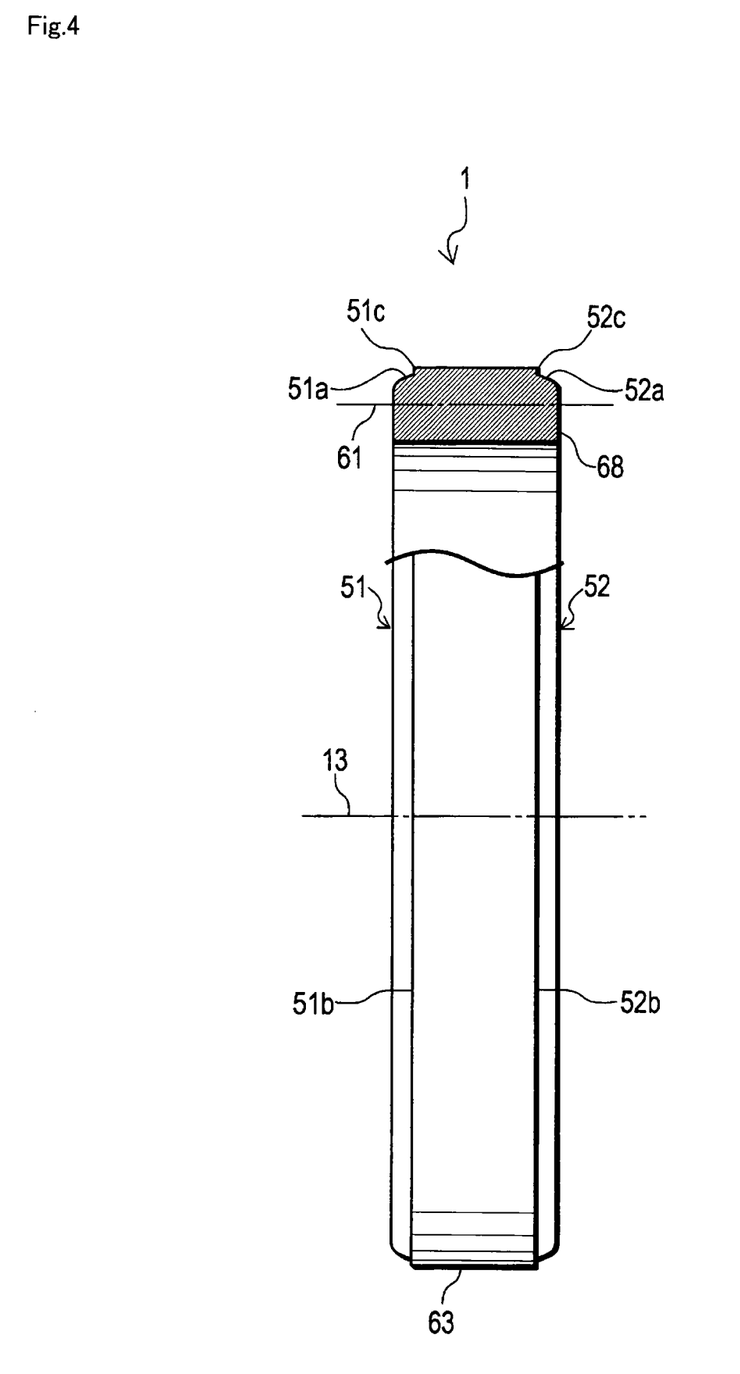
FIG. 4 is a partially sectional side view of the gasket of FIG. 1.
Figure 5:
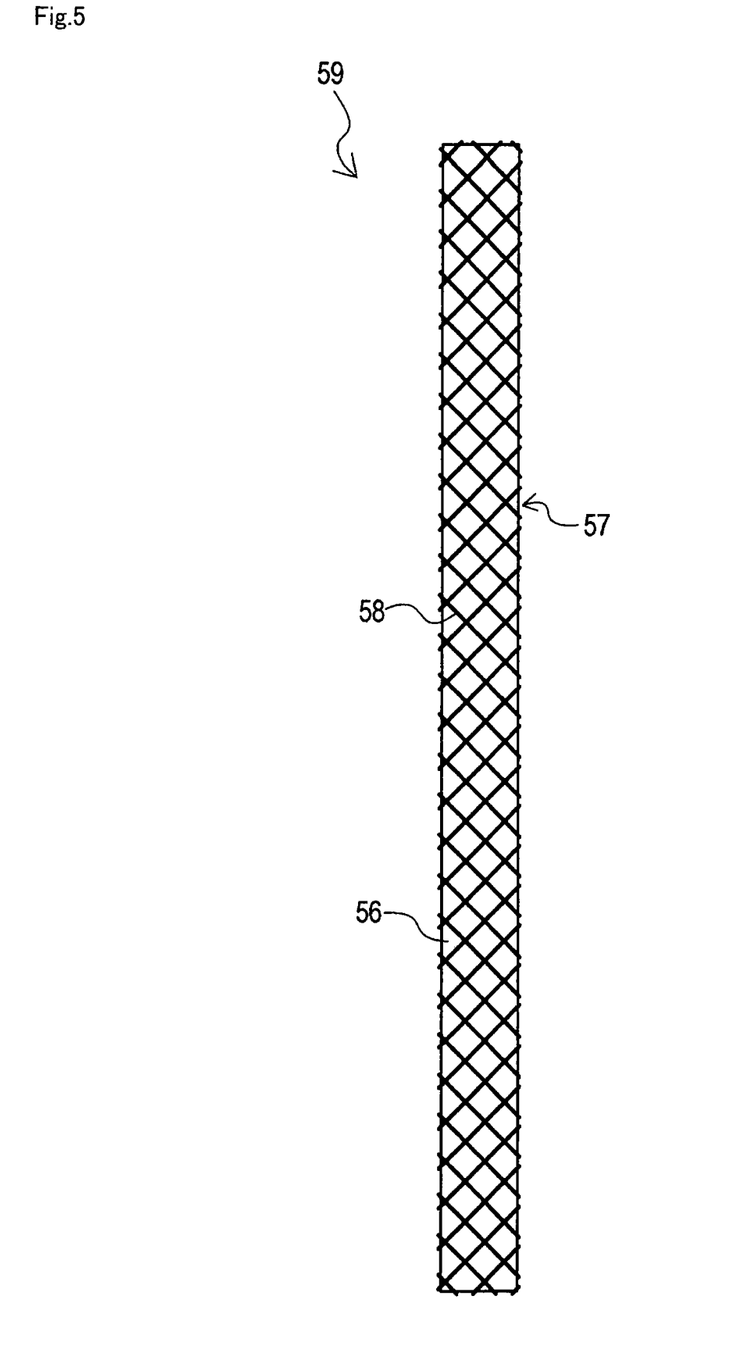
FIG. 5 is a view showing materials of the gasket.
Figure 6:
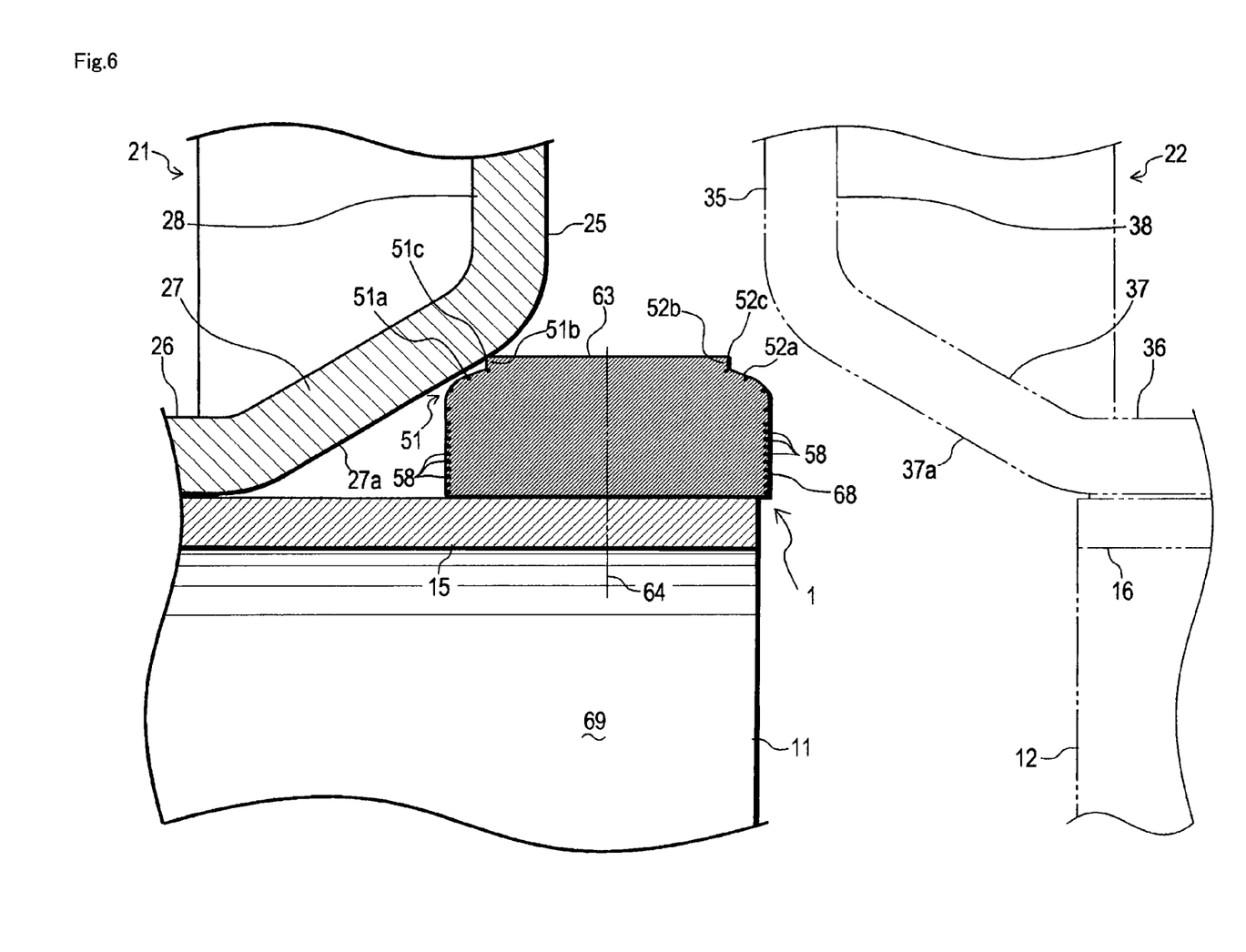
FIG. 6 is a partial enlarged view showing a state where the gasket of FIG. 1 has not yet been applied to the joint.
Figure 7:
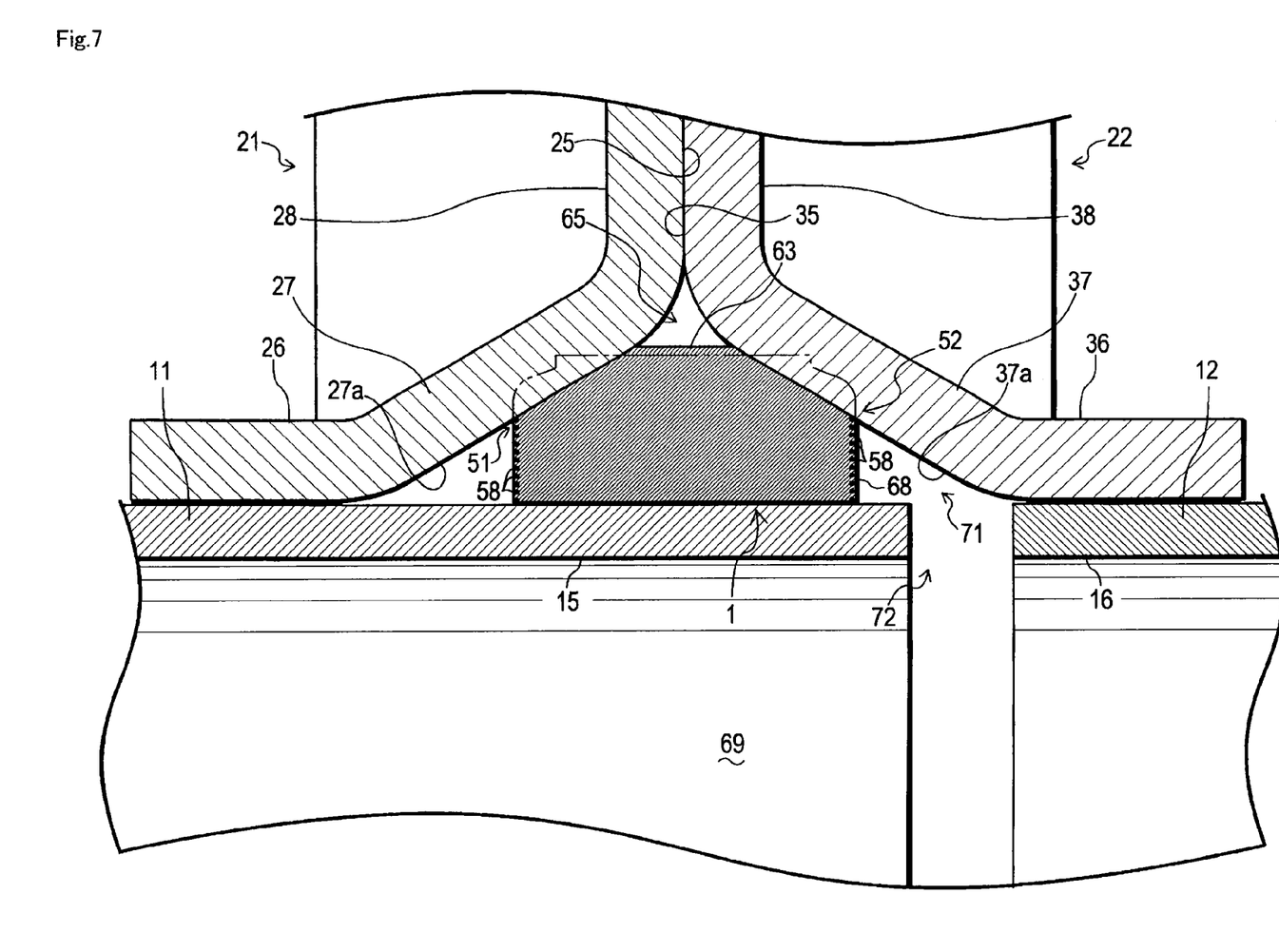
FIG. 7 is a partial enlarged view showing a state where the gasket of FIG. 1 has been applied to the joint.

FIG. 2 is a front view of the gasket 1, FIG. 3 is a back view of the gasket 1, FIG. 4 is a partially sectional side view of the gasket 1, FIG. 5 shows materials of the gasket, FIG. 6 is a partial enlarged view showing a state where the gasket 1 has not yet been applied to the joint 10, and FIG. 7 is a partial enlarged view showing a state where the gasket 1 has been applied to the joint 10.

As shown in FIGS. 1 to 4, the gasket 1 includes the first sealing portion 51 and the second sealing portion 52. The gasket 1 is configured by using an expanded graphite tape 56 and a metal mesh member 57. In the figures, for the sake of convenience, illustration of the expanded graphite tape 56 and the metal mesh member 57 (metal wires 58) is appropriately omitted except FIG. 5 and parts FIGS. 6 and 7.

In the embodiment, the gasket 1 has a configuration where a composite tape 59 in which the expanded graphite tape 56 is enclosed by the metal mesh member 57 is produced by applying a predetermined knitting method such as a loop forming knitting method to the metal wires 58 such as stainless steel wires around the expanded graphite tape 56 (see FIG. 5), the composite tape 59 is spirally wound a plurality of times, and the wound tape is compression molded, thereby forming the first sealing portion 51 and the second sealing portion 52.

As shown also in FIGS. 6 and 7, the first sealing portion 51 has a first butting surface 51a and a first projecting portion 51b, and is formed in the radially outer side of the gasket 1 so that the first butting surface 51a and the first projecting portion 51b can butt against the first tapered inner circumferential surface 27a of the first flange 21. Specifically, the first sealing portion 51 is disposed in an opposing portion of one side in the direction of the axis 13 of the gasket 1. When the gasket 1 is applied to the joint 10, the opposing portion is opposed to the first tapered inner circumferential surface 27a of the first flange 21.

In the first sealing portion 51, the first butting surface 51a is formed into a tapered shape corresponding to the tapered shape of the first tapered inner circumferential surface 27a of the first tapered portion 27 in which the diameter is gradually increased as proceeding toward the second flange 22 (from the upstream side in the exhaust gas flow direction toward the downstream side in the exhaust gas flow direction). Specifically, an end portion which is in the radially outer side of the gasket 1, and which is on one side in the direction of the axis 13 is notched away, whereby the first butting surface 51a is formed into a tapered surface in which the diameter is gradually increased as proceeding from the upstream side in the exhaust gas flow direction toward the downstream side in the exhaust gas flow direction.

The first projecting portion 51b can be projected toward the first tapered inner circumferential surface 27a as compared with the first butting surface 51a. The first projecting portion 51b is placed downstream from the first butting surface 51a in the exhaust gas flow direction (on the inner side in the direction of the axis 13). The first projecting portion 51b has a first projecting end portion 51c which is formed into a pointed shape, and which is located radially outside the first butting surface 51a. The first projecting portion 51b is disposed so that, in accordance with relative movement of the first flange 21, the first projecting end portion 51c begins to butt against the opposing first tapered inner circumferential surface 27a.

As shown in FIG. 4, the first butting surface 51a is placed radially outside the centerline 61 of the radial thickness of the gasket 1. The first projecting portion 51b is continuous to the outer circumferential portion 63 of the gasket 1 in addition to the first butting surface 51a, and placed so that the first projecting end portion 51c is located on the outer circumferential surface of the gasket 1.

As described above, the first sealing portion 51 has the configuration where, when the first and second flanges 21, 22 which are opposed to each other are fastened together by the function of the press contacting mechanism 23, the gasket 1 interposed between the flanges 21, 22 is pressed against the first flange 21, whereby the gasket is pressed to be compression deformed while the first butting surface 51a and the first projecting portion 51b butt against the first tapered inner circumferential surface 27a of the first flange 21.

The second sealing portion 52 has a second butting surface 52a and a second projecting portion 52b, and is formed in the radially outer side of the gasket 1 so that the second butting surface 52a and the second projecting portion 52b can butt against the second tapered inner circumferential surface 37a of the second flange 22. Specifically, the second sealing portion 52 is disposed in an opposing portion of the other side in the direction of the axis 13 of the gasket 1. When the gasket 1 is applied to the joint 10, the opposing portion is opposed to the second tapered inner circumferential surface 37a of the second flange 22.

In the second sealing portion 52, the second butting surface 52a is formed into a tapered shape corresponding to the tapered shape of the second tapered inner circumferential surface 37a of the second tapered portion 37 in which the diameter is gradually increased as proceeding toward the first flange 21 (from the downstream side in the exhaust gas flow direction toward the upstream side in the exhaust gas flow direction). Specifically, an end portion which is in the radially outer side of the gasket 1, and which is on the other side in the direction of the axis 13 is notched away, whereby the second butting surface 52a is formed into a tapered surface in which the diameter is gradually increased as proceeding from the downstream side in the exhaust gas flow direction toward the upstream side in the exhaust gas flow direction.

The second projecting portion 52b can be projected toward the second tapered inner circumferential surface 37a as compared with the second butting surface 52a. The second projecting portion 52b is placed upstream from the second butting surface 52a in the exhaust gas flow direction (on the inner side in the direction of the axis 13). The second projecting portion 52b has a second projecting end portion 52c which is formed into a pointed shape, and which is located radially outside the second butting surface 52a. The second projecting portion 52b is disposed so that, in accordance with relative movement of the second flange 22, the second projecting end portion 52c begins to butt against the opposing second tapered inner circumferential surface 37a.

As shown in FIG. 4, the second butting surface 52a is placed radially outside the centerline 61 of the radial thickness of the gasket 1. The second projecting portion 52b is continuous to the outer circumferential portion 63 in addition to the second butting surface 52a, and placed so that the second projecting end portion 52c is located on the outer circumferential surface of the gasket 1.

As described above, the second sealing portion 52 has the configuration where, when the first and second flanges 21, 22 which are opposed to each other are fastened together by the function of the press contacting mechanism 23, the second flange 22 is pressed against the gasket 1 interposed between the flanges 21, 22, whereby the gasket is pressed to be compression deformed while the second butting surface 52a and the second projecting portion 52b butt against the second tapered inner circumferential surface 37a of the second flange 22.

According to the configuration, when sealing using the gasket 1 is to be performed (when the first and second flanges 21, 22 between which the gasket 1 fitted onto the tip end portion 15 of the first exhaust pipe 11 is interposed are to be fastened together), the whole first sealing portion 51 is pressed so that the first projecting portion 51b collapses, against the first tapered inner circumferential surface 27a of the first flange 21 which is opposed to the first sealing portion, and the contact surface pressure between the first sealing portion 51 and the first flange 21 can be increased.

In this case, the whole second sealing portion 52 is pressed so that the second projecting portion 52b collapses, by the second tapered inner circumferential surface 37a of the second flange 22 which is opposed to the second sealing portion, and the contact surface pressure between the second sealing portion 52 and the second flange 22 can be increased. Therefore, a high sealing property can be certainly ensured between the first and second flanges 21, 22.

In the embodiment, as shown in FIG. 4, the gasket 1 includes the outer circumferential portion 63 which is formed between the first and second sealing portions 51, 52 with respect to the direction of the axis 13. As shown in FIG. 7, the outer circumferential portion 63 is configured so as to, in the case where the portion is interposed between the first and second flanges 21, 22, define an accommodating space 65 which is a closed space, between the flanges 21, 22.

According to the configuration, in the case where sealing using the gasket 1 is to be performed, even when the outer circumferential portion 63 tends to move toward the accommodating space 65 in association with the compression deformations of the first and second sealing portions 51, 52 due to the fastening of the first and second flanges 21, 22, the outer circumferential portion 63 can be accommodated and confined in the accommodating space 65 which is a closed space (see FIG. 7). Therefore, the stress applied to the gasket 1 can be prevented from being reduced, and the sealing property of the gasket 1 can be satisfactorily maintained.

In the embodiment, as shown in FIGS. 1, 4, 6, and 7, the first sealing portion 51 and the second sealing portion 52 are formed into a shape which is symmetrical across the outer circumferential portion 63. More specifically, the gasket 1 is formed into a shape in which the axial one side including the first sealing portion 51, and the axial other side including the second sealing portion 52 are symmetrical with each other (a shape which is symmetrical about a symmetrical axis 64 that is set in the middle in the direction of the axis 13).

According to the configuration, the gasket 1 interposed between the first and second flanges 21, 22 is enabled to more certainly exert a high sealing property irrespective of the direction of the gasket 1. When the gasket 1 is to be fitted onto the first exhaust pipe 11, moreover, it is not necessary to consider the direction of the gasket 1, and hence the workability can be improved.

In the embodiment, as shown in FIGS. 1, 3, 4, 6, and 7, the gasket 1 further includes an exposed portion 68. The exposed portion 68 is disposed in the radially inner side of the second sealing portion 52 so as to be exposed to the interiors (exhaust gas flow path) 69 of the first and second exhaust pipes 11, 12. As exaggeratedly shown in FIGS. 6 and 7, the metal wires 58 of the metal mesh member 57 are concentrically disposed in the exposed portion 68.

Specifically, the exposed portion 68 is disposed in a portion of the gasket 1 which is on the side of the second flange 22, and in the radially inner side of the second sealing portion 52, and placed so as to face a first gap 71 which is formed between the gasket 1 and the second tapered portion 37. The radially inner side of the first gap 71 communicates with the exhaust gas flow path 69 through a second gap 72 which is formed between the tip end portion 15 of the first exhaust pipe 11 and the basal end portion 16 of the second exhaust pipe 12.

As described above, the exposed portion 68 is configured so as to, after the application of the gasket 1 to the joint 10, be exposed to the exhaust gas flow path 69 through the first and second gaps 71, 72 as shown in FIG. 7. In the exposed portion 68, the metal wires 58 eccentrically exist or are placed more densely than in the other portion of the gasket 1. The portion of the expanded graphite in the expanded graphite tape 56 is prevented as far as possible from being exposed to the exhaust gas flow path 69, by the metal wires 58 which are densely placed.

According to the configuration, when the first and second flanges 21, 22 are to be fastened together so that the gasket 1 is compression deformed, the expanded graphite portion can be prevented by the metal wires 58 of the metal mesh member 57 from protruding from the portion where the exposed portion 68 exists, toward the interiors (exhaust gas flow path) 69 of the first and second exhaust pipes 11, 12. In this case, namely, excess deformation of the whole gasket 1 caused by the exposed portion 68 can be prevented from occurring. Therefore, the contact surface pressure of the second butting surface 52a of the second sealing portion with respect to the second tapered inner circumferential surface 37a of the second flange 22 can be maintained at a predetermined value, and reduction of the sealing property of the gasket 1 can be suppressed.

In the gasket 1, moreover, the metal wires 58 of the metal mesh member 57 can cause the expanded graphite portion to hardly contact with the exhaust gas flowing through the interiors (exhaust gas flow path) 69 of the first and second exhaust pipes 11, 12. Therefore, deterioration of the expanded graphite portion due to contact with the exhaust gas can be suppressed, and the durability of the gasket 1 can be improved.

DESCRIPTION OF REFERENCE NUMERALS 1 gasket
11 first exhaust pipe
12 second exhaust pipe
15 tip end portion
16 basal end portion
21 first flange
22 second flange
27a first tapered inner circumferential surface
37a second tapered inner circumferential surface
51 first sealing portion
51a first butting surface
51b first projecting portion
52 second sealing portion
52a second butting surface
52b second projecting portion
56 expanded graphite tape
57 metal mesh member
58 metal wire
63 outer circumferential portion
68 exposed portion

The invention claimed is:

1. A gasket which is annular, which is to be interposed between a first flange of a first exhaust pipe and a second flange of a second exhaust pipe in a state where the gasket is fitted onto an end portion of the first exhaust pipe, in order to seal a gap between the end portion of the first exhaust pipe and an end portion of the second exhaust pipe, the gasket being configured by using an expanded graphite tape and a metal mesh member, wherein
the gasket includes:
a first sealing portion having:
a first butting surface having a tapered shape corresponding to a tapered shape of a first tapered inner circumferential surface of the first flange in which a diameter is gradually increased as proceeding toward the second flange; and
a first projecting portion which projects radially toward the first tapered inner circumferential surface from a first end of the first butting surface and terminates with a first projecting end portion located radially outside the first end of the first butting surface, the first sealing portion being formed in a radially outer side so as to allow the first butting surface, the first projecting portion, and the first projecting end portion to butt against the first tapered inner circumferential surface; and a second sealing portion having:
- a second butting surface having a tapered shape corresponding to a tapered shape of a second tapered inner circumferential surface of the second flange in which a diameter is gradually increased as proceeding toward the first flange; and
- a second projecting portion which projects radially toward the second tapered inner circumferential surface from a first end of the second butting surface and terminates with a second projecting end portion located radially outside the first end of the second butting surface, the second sealing portion being formed in a radially outer side so as to allow the second butting surface, the second projecting portion, and the second projecting end portion to butt against the second tapered inner circumferential surface.

2. The gasket according to claim 1, wherein
the gasket further includes an outer circumferential portion which is formed between the first sealing portion and the second sealing portion with respect to an axial direction, and
the first sealing portion and the second sealing portion are formed into a shape which is symmetrical across the outer circumferential portion.

3. The gasket according to claim 1, wherein
the gasket further includes an exposed portion which is disposed in a radially inner side of the second sealing portion to be exposed to interiors of the first exhaust pipe and the second exhaust pipe, and
metal wires of the metal mesh member are concentrically disposed in the exposed portion.

4. The gasket according to claim 1, wherein
the first projecting end portion and the second projecting end portion are each formed into a pointed shape.

\* \* \* \* \*